United States Patent
Korte et al.

(10) Patent No.: US 9,744,882 B2
(45) Date of Patent: Aug. 29, 2017

(54) TWO-AXIS SEAT HINGE

(71) Applicant: Honda Motor Co., Ltd., Tokyo (JP)

(72) Inventors: Joseph H Korte, Marysville, OH (US); J. Michael Cole, Dublin, OH (US); Ryan J Holoweiko, Delaware, OH (US); Edgar A Escobar, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 51 days.

(21) Appl. No.: 14/959,041

(22) Filed: Dec. 4, 2015

(65) Prior Publication Data
US 2017/0158090 A1    Jun. 8, 2017

(51) Int. Cl.
| | |
|---|---|
| *A47C 7/62* | (2006.01) |
| *A47C 31/00* | (2006.01) |
| *B60N 2/10* | (2006.01) |
| *B60N 2/02* | (2006.01) |
| *B60N 2/427* | (2006.01) |
| *B60N 2/30* | (2006.01) |
| *B60N 2/04* | (2006.01) |
| *B60N 2/12* | (2006.01) |
| *B60N 2/015* | (2006.01) |

(Continued)

(52) U.S. Cl.
CPC ............ *B60N 2/10* (2013.01); *B60N 2/0244* (2013.01); *B60N 2/01583* (2013.01); *B60N 2/04* (2013.01); *B60N 2/045* (2013.01); *B60N 2/0715* (2013.01); *B60N 2/12* (2013.01); *B60N 2/16* (2013.01); *B60N 2/309* (2013.01); *B60N 2/3065* (2013.01); *B60N 2/3097* (2013.01); *B60N 2/427* (2013.01); *B60N 2002/0268* (2013.01)

(58) Field of Classification Search
CPC ........ B60N 2/04; B60N 2/01583; B60N 2/12; B60N 2/16; B60N 2/045; B60N 2/0715; B60N 2/427; B60N 2/3065; B60N 3/309; B60N 2/3097
USPC .................................. 297/217.3, 331, 378.13
See application file for complete search history.

(56) References Cited

U.S. PATENT DOCUMENTS

| | | | |
|---|---|---|---|
| 1,643,715 | A | 9/1927 | Kleinsmith |
| 3,369,629 | A | 2/1968 | Weiss |
| 3,512,599 | A | 5/1970 | Hott et al. |

(Continued)

OTHER PUBLICATIONS

"2009 Ford Escape Hybrid" http://www.cars.com/ford/escape-hybrid/2009/expert-reviews (Accessed Jun. 16, 2015).

(Continued)

*Primary Examiner* — Chi Q Nguyen
(74) *Attorney, Agent, or Firm* — Honda Patents & Technologies North America, LLC; Mark E. Duell

(57) ABSTRACT

A movable seat for a motor vehicle includes a base fixedly attached to a frame of the motor vehicle, a seat frame having a top side and a bottom side, and a seat cushion fixedly attached to the top side of the seat frame. A U-shaped hinge connects the seat frame to the base, a first end of the first U-shaped hinge being rotatably attached to the base and rotating about a first lateral axis, and a second end of the U-shaped hinge being rotatably attached to the seat frame and rotating about a second lateral axis. A wire that connects a first electrical appliance in the seat cushion to a second electrical appliance is included that is attached to the U-shaped hinge from the first end to the second end.

13 Claims, 6 Drawing Sheets

(51) Int. Cl.
 *B60N 2/16* (2006.01)
 *B60N 2/07* (2006.01)

(56) References Cited

U.S. PATENT DOCUMENTS

| | | | | |
|---|---|---|---|---|
| 4,395,011 A * | 7/1983 | Torta | ................. | B60N 2/01591 |
| | | | | 248/393 |
| 4,408,798 A | 10/1983 | Mizushima et al. | | |
| 5,393,121 A * | 2/1995 | Reuss | ..................... | B60N 2/12 |
| | | | | 296/65.05 |
| 5,683,140 A * | 11/1997 | Roth | ....................... | B60N 2/12 |
| | | | | 248/394 |
| 5,988,726 A | 11/1999 | Onoda et al. | | |
| 6,011,318 A | 1/2000 | Mayoras et al. | | |
| 6,019,413 A | 2/2000 | Scraver et al. | | |
| 6,024,397 A | 2/2000 | Scraver et al. | | |
| 6,394,525 B1 | 5/2002 | Seibold | | |
| 6,935,691 B1 * | 8/2005 | Sasaki | ................. | B60N 2/0812 |
| | | | | 248/421 |
| 7,270,375 B2 * | 9/2007 | Lutzka | ................... | B60N 2/206 |
| | | | | 297/331 |
| 2003/0197410 A1 * | 10/2003 | Blair | ................... | B60N 2/0705 |
| | | | | 297/378.12 |
| 2003/0214167 A1 * | 11/2003 | Boehmer | ............ | B60N 2/7005 |
| | | | | 297/378.13 |
| 2005/0127740 A1 * | 6/2005 | Dowty | ................... | B64D 11/06 |
| | | | | 297/487 |
| 2012/0133188 A1 * | 5/2012 | Wieclawski | ......... | B60N 2/2245 |
| | | | | 297/378.13 |
| 2016/0347214 A1 | 12/2016 | Miyazawa et al. | | |

OTHER PUBLICATIONS

"Chevrolet Impala" http://ask.cars.com/2009/07/does-the-backseat-on-the-newer-chevrolet-impalas-fold-down-to-provide-extended-cargo-room-from-the-t.html (Accessed Jun. 16, 2015).

"2009-2010 Dodge Journey" http://www.allpar.com/SUVs/dodge/journey-2009.html (Accessed Jun. 16, 2015).

"What quirky "hidden features" have you found on your car?" http://www.reddit.com/r/cars/comments/2z5rq9/found_out_to-day_that_if_a_front_indicator_light/(Accessed Jun. 16, 2015).

* cited by examiner

US 9,744,882 B2

TWO-AXIS SEAT HINGE

BACKGROUND

The embodiments discussed are directed to a movable seat arrangement for a motor vehicle such as a side-by-side, off-road, multi-utility vehicle ("MUV").

MUV's are smaller than typical motor vehicles, such as automobiles, and as such, have premium on space. MUV's are also constructed more like all-terrain vehicles (ATV) in that they have simpler components on frame constructions. In particular, the seats of the typical MUV may cover up either a storage space or, alternatively, mechanical systems that, from time-to-time, require maintenance.

Additionally, due to the larger size of MUV's, additional regulations are applicable such as vehicle regulations related to occupant detection. In order to comply with regulations, in may be necessary to place sensors in the seats of a MUV, and in turn, there is a need to protect the wiring related to such a sensor or other electrical appliance placed in a seat when the seat is removed during access to the area beneath the seat for maintenance or removal of an object from storage.

APPLICATION SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

According to one aspect, a movable seat for a motor vehicle includes a base fixedly attached to a frame of the motor vehicle, a seat frame having a top side and a bottom side, and a seat cushion fixedly attached to the top side of the seat frame. A first U-shaped hinge connects the seat frame to the base, a first end of the first U-shaped hinge being rotatably attached to the base and rotating about a first lateral axis, and a second end of the first U-shaped hinge being rotatably attached to the seat frame and rotating about a second lateral axis. A wire that connects a first electrical appliance in the seat cushion to a second electrical appliance is included that is attached to the first U-shaped hinge from the first end to the second end.

According to another aspect, a movable seat for a motor vehicle includes a base fixedly attached to a frame of the motor vehicle, a seat frame having a top side and a bottom side, and a seat cushion fixedly attached to the top side of the seat frame. A first U-shaped hinge connects the seat frame to the base, a first end of the first U-shaped hinge being rotatably attached to the base and rotating about a first lateral axis. A second end of the first U-shaped hinge is rotatably attached to the seat frame and rotating about a second lateral axis. A second U-shaped hinge connects the seat frame to the base, a first end of the second U-shaped hinge being rotatably attached to the base and rotating about the first lateral axis. A second end of the second U-shaped hinge is rotatably attached to the seat frame and rotating about the second lateral axis. A first bracket is attached to the seat frame, the second end of the first U-shaped hinge being connected to the bracket by a free rotation bolt along the second lateral axis, thereby creating a rotatable connection between the first U-shaped hinge and the seat frame along the second lateral axis. A second bracket is attached to the seat frame, the second end of the second U-shaped hinge being connected to the bracket by a free rotation bolt along the second lateral axis, thereby creating a rotatable connection between the second U-shaped hinge and the seat frame along the second lateral axis. A wire connects a first electrical appliance in the seat cushion to a second electrical appliance, the wire attached to the first U-shaped hinge from the first end to the second end.

The figures depict various embodiments of the embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Figure 1:
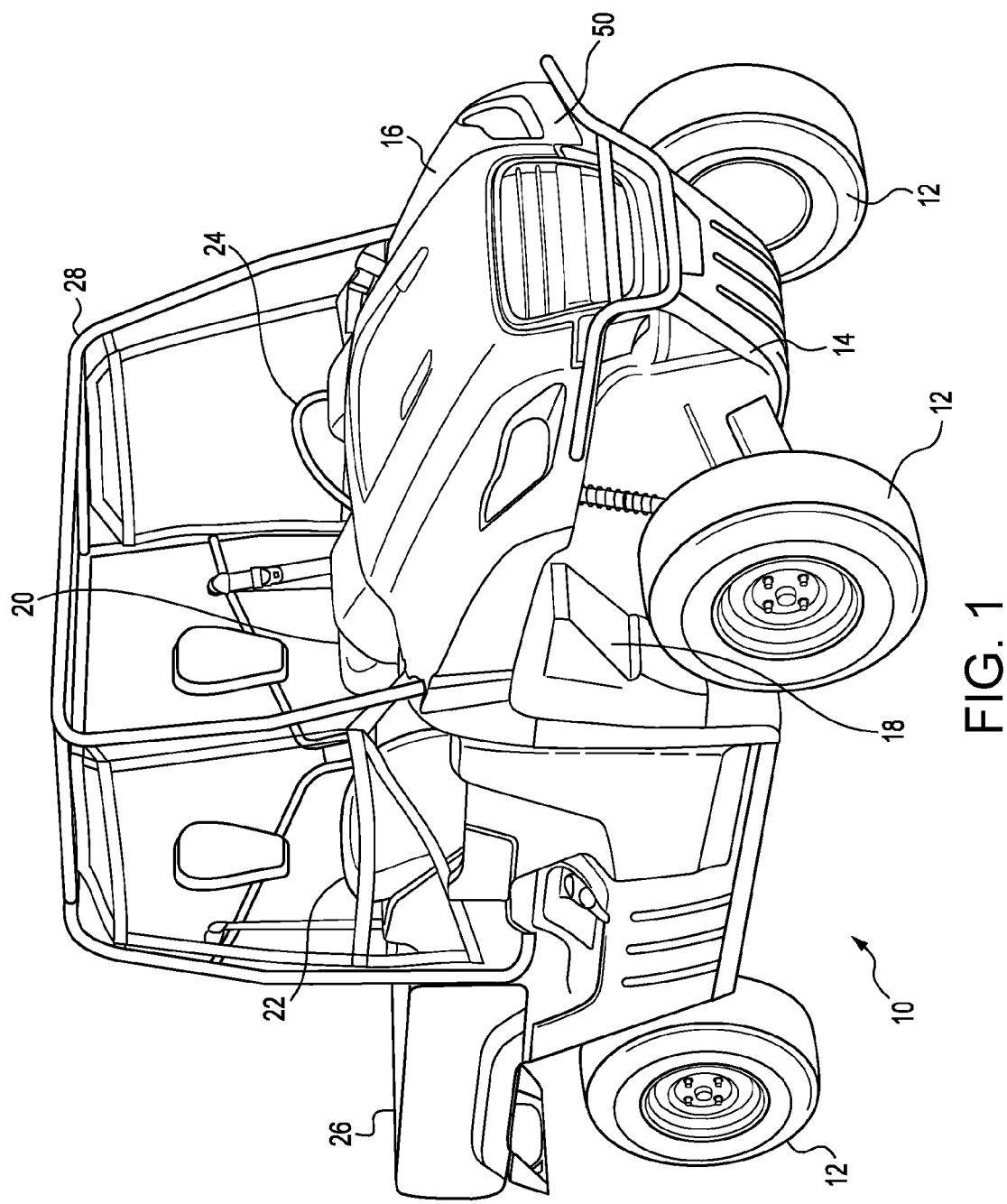
FIG. 1 is perspective view of a vehicle.

FIG. 1 shows an embodiment of a vehicle 10 that is a motorized multi-utility vehicle ("MUV"). The vehicle 10 includes four wheels 12, a motor 14, a body 16, a frame 18, a driver's seat 20, a passenger seat 22, a steering wheel 24, a cargo area 26, and a roll cage 28.

FIGS. 2-6 illustrate an embodiment of a movable seat 30 for use in the vehicle 10. The movable seat 30 may be either the passenger seat 22 or driver's seat 20 as illustrated in FIG. 1. The movable seat 30 may also be a bench seat in which driver's seat 20 and passenger seat 22 are integrally formed. The movable seat 30 includes a base 32 that is attached to the frame 18 of the vehicle 10. The movable seat 30 also includes a seat frame 34 and a seat cushion 36. The seat cushion 36 is fixedly attached to the top side 38 of the seat frame 34, and the bottom side 40 of the seat frame rests on top 42 of the base 32. Together, the base 32, seat frame 34, and seat cushion 36 forms a compartment 44 that may either be used for storage, or the compartment 44 may house mechanicals for the MUV. In either situation, the need may arise to gain entry to the compartment 44 by moving the seat frame 34 and seat cushion 36, collectively referred to herein as the seat top 46.

Figure 6:
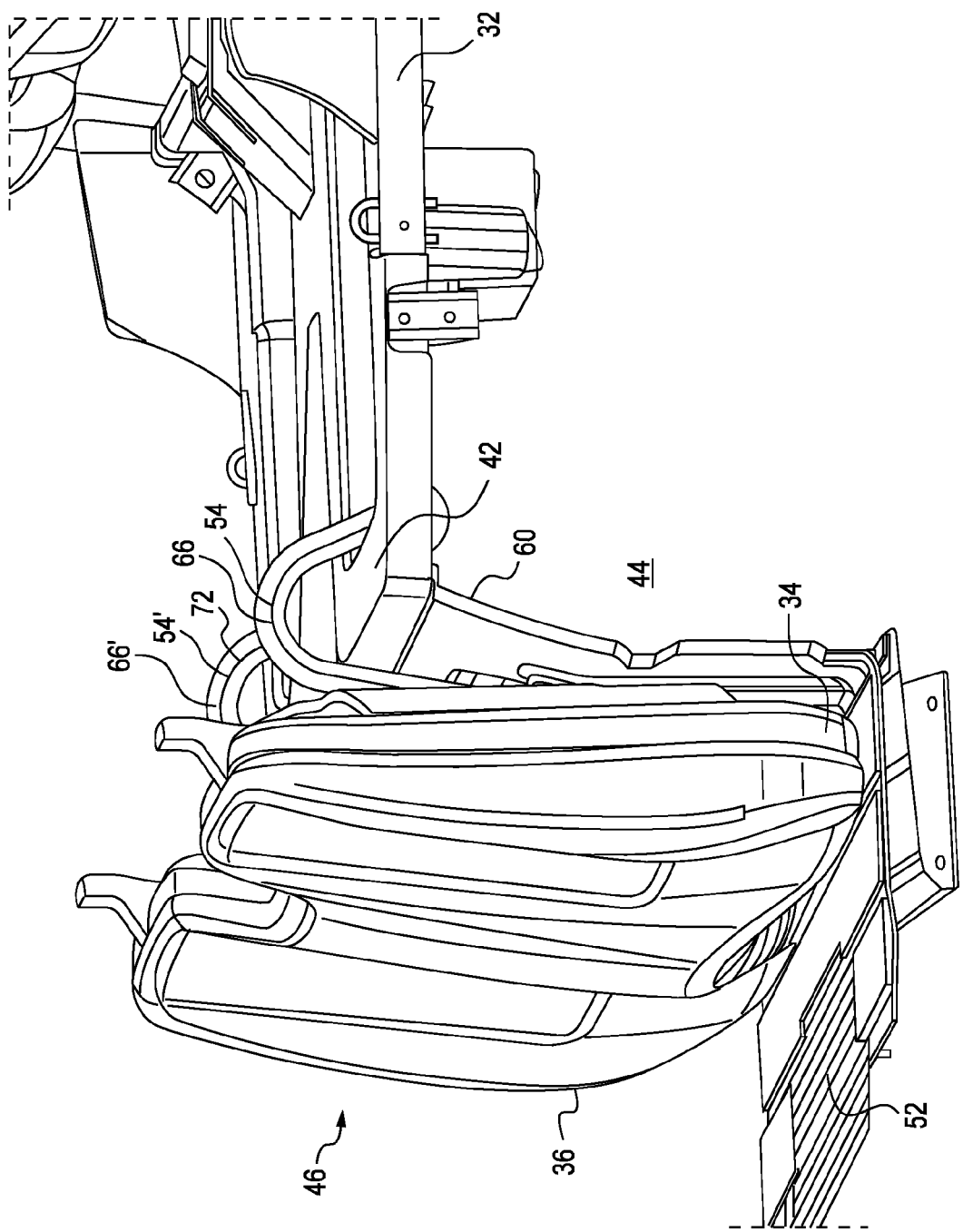
FIG. 6 is a side perspective view of a movable seat for the vehicle illustrated in FIG. 1.

In order to facilitate moving the seat top 46, there is provided a hinge 48 that is attached to the seat frame 34 and the base 32. The hinge 48 is designed to allow the seat top 46 to be lifted up off the base 32, and then rotated about a first lateral axis $a_1$ relative to the front 50 of the vehicle 10, illustrated in FIG. 1, such that the seat top 46 is moved from a horizontal position on top of the base 32, as illustrated in FIG. 2, to a vertical position in the foot well 52 in front of the base 32, as illustrated in FIG. 6.

Figure 2:
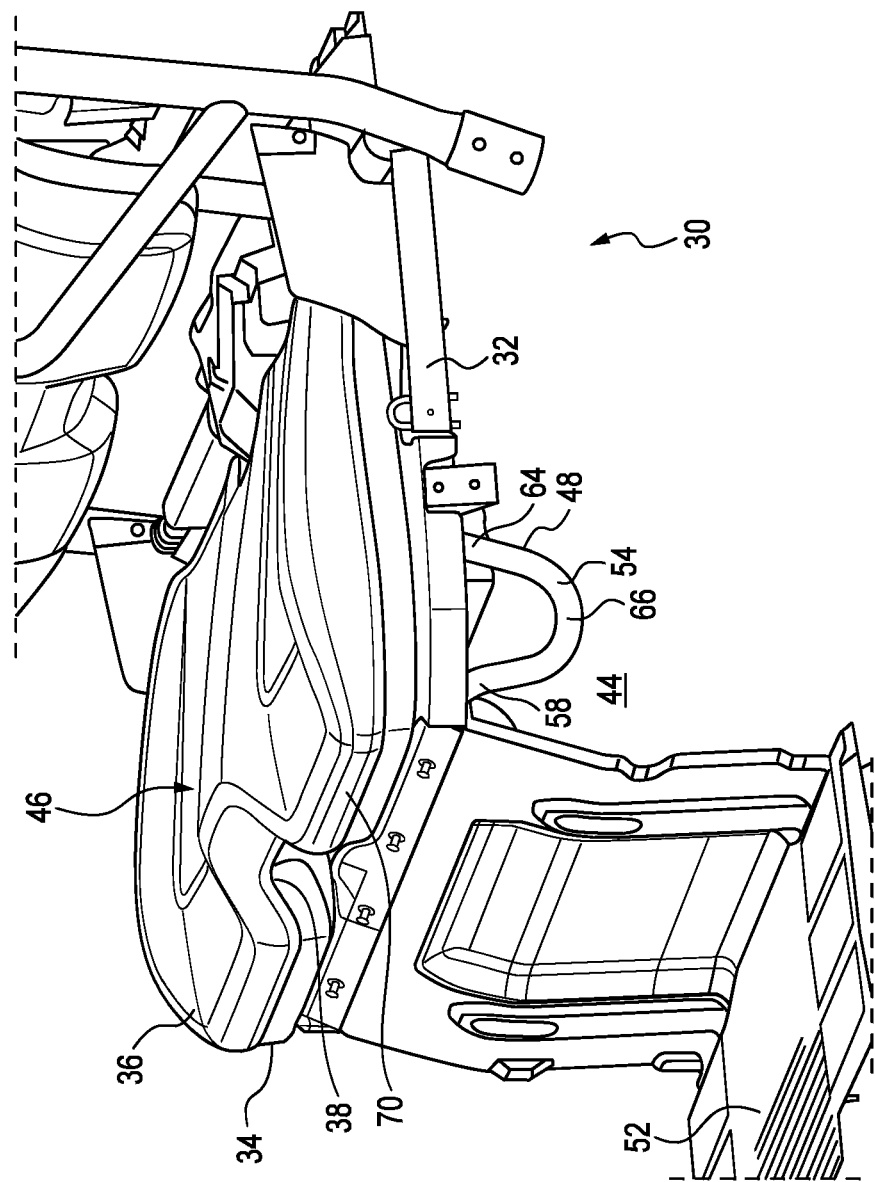
FIG. 2 is a side perspective view of a movable seat for the vehicle illustrated in FIG. 1.
Figure 3:
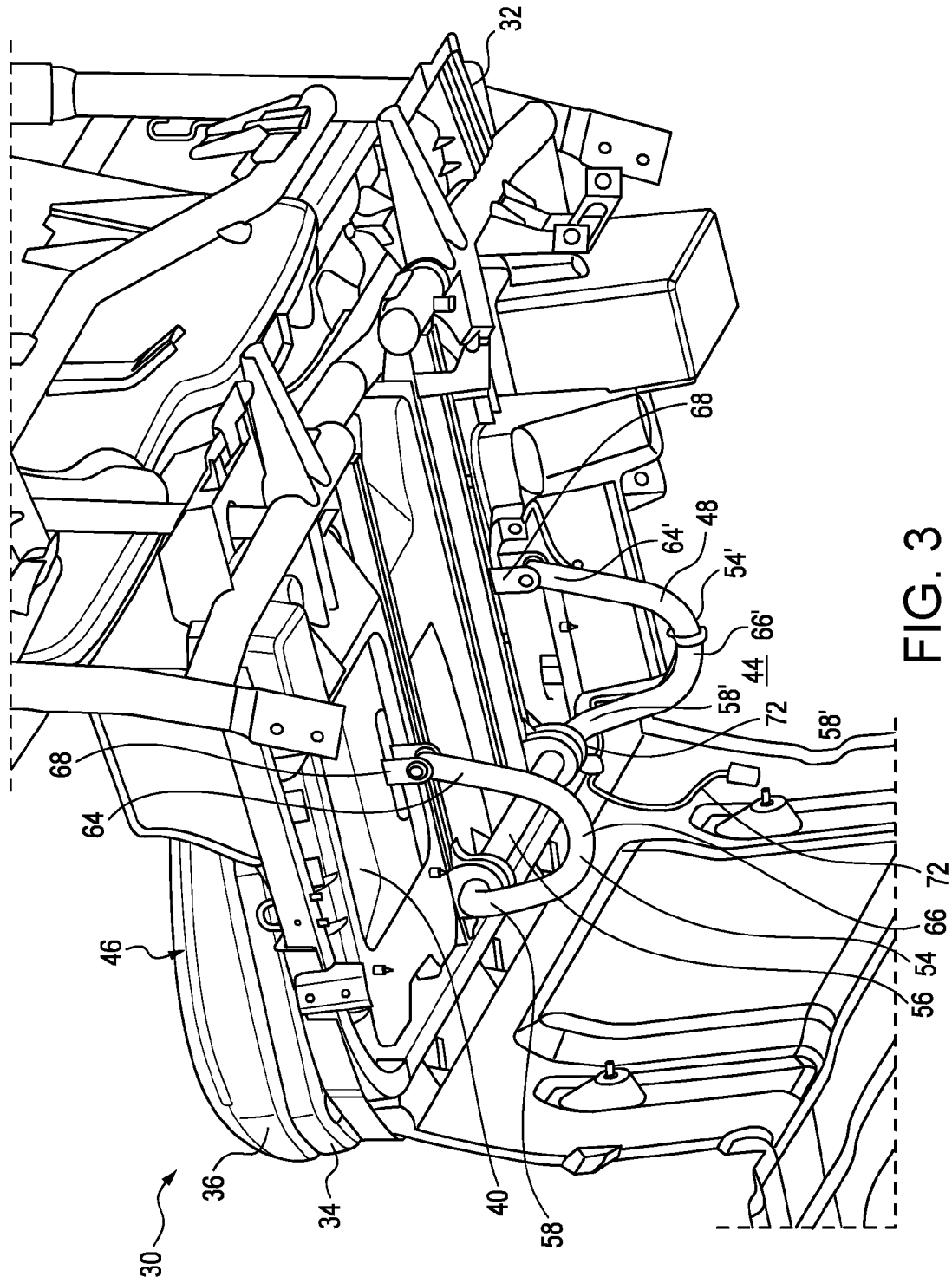
FIG. 3 is a left, rear, and upwardly perspective view of a movable seat for the vehicle illustrated in FIG. 1.

In the embodiment illustrated in FIGS. 2-6, the hinge 48 has two U-shaped components 54,54' and a hinge bar 56 that extends between first ends 58,58' each the two U-shaped components 54,54'. The hinge bar 56 is connected to an inner side 60 of the base 32 of the movable seat 30 by, as shown in FIG. 2, two bushings 62. The bushings 62 may be welded or bolted to the inner side 60 of the top 42 of the base 32, and the bushings 62 are laterally spaced from each other and aligned along the first lateral axis $a_1$. The hinge bar 56 is threaded through the two bushings 62. The bushings 62 allow for smooth rotation of the hinge bar 56 around the first lateral axis $a_1$ inside the bushings 62. Any type of bushing 62 known to one skilled in the art may be used to ensure smooth rotation. The bushings 62, for instance, may include ball bearings to enable smooth rotation of the hinge bar 56 inside the bushings 62.

The U-shaped components 54,54' are oriented such that when the seat top 46 is in the vehicle position, when the seat top 46 is resting horizontally atop the seat base 32 as illustrated in FIG. 2, the first ends 58,58' and second ends 64,64' of the U-shaped components 54,54' are above the rounded center portion 66,66' of the U-shaped components 54,54'.

Figure 4:
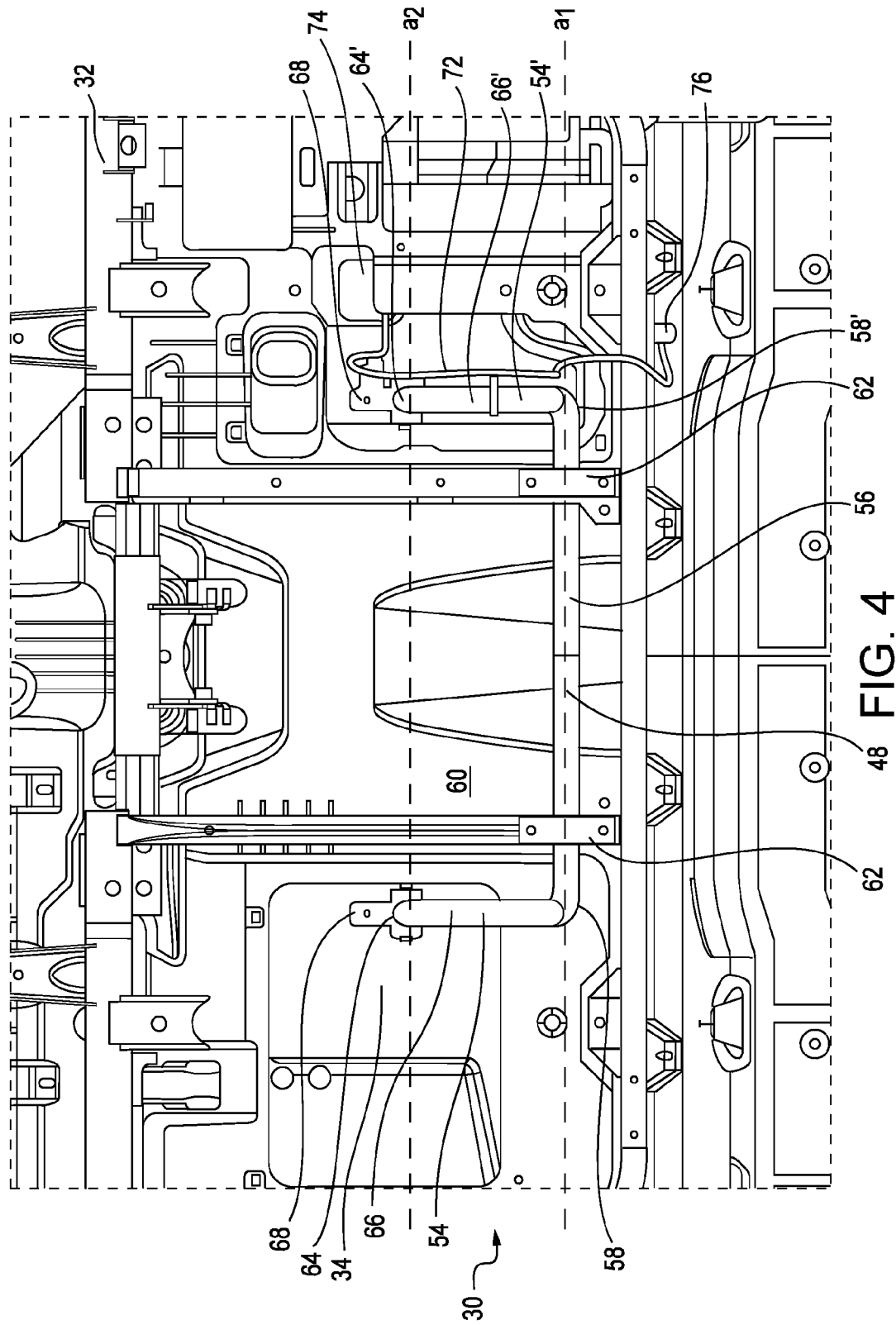
FIG. 4 is a bottom view of a movable seat for the vehicle illustrated in FIG. 1.
Figure 5:
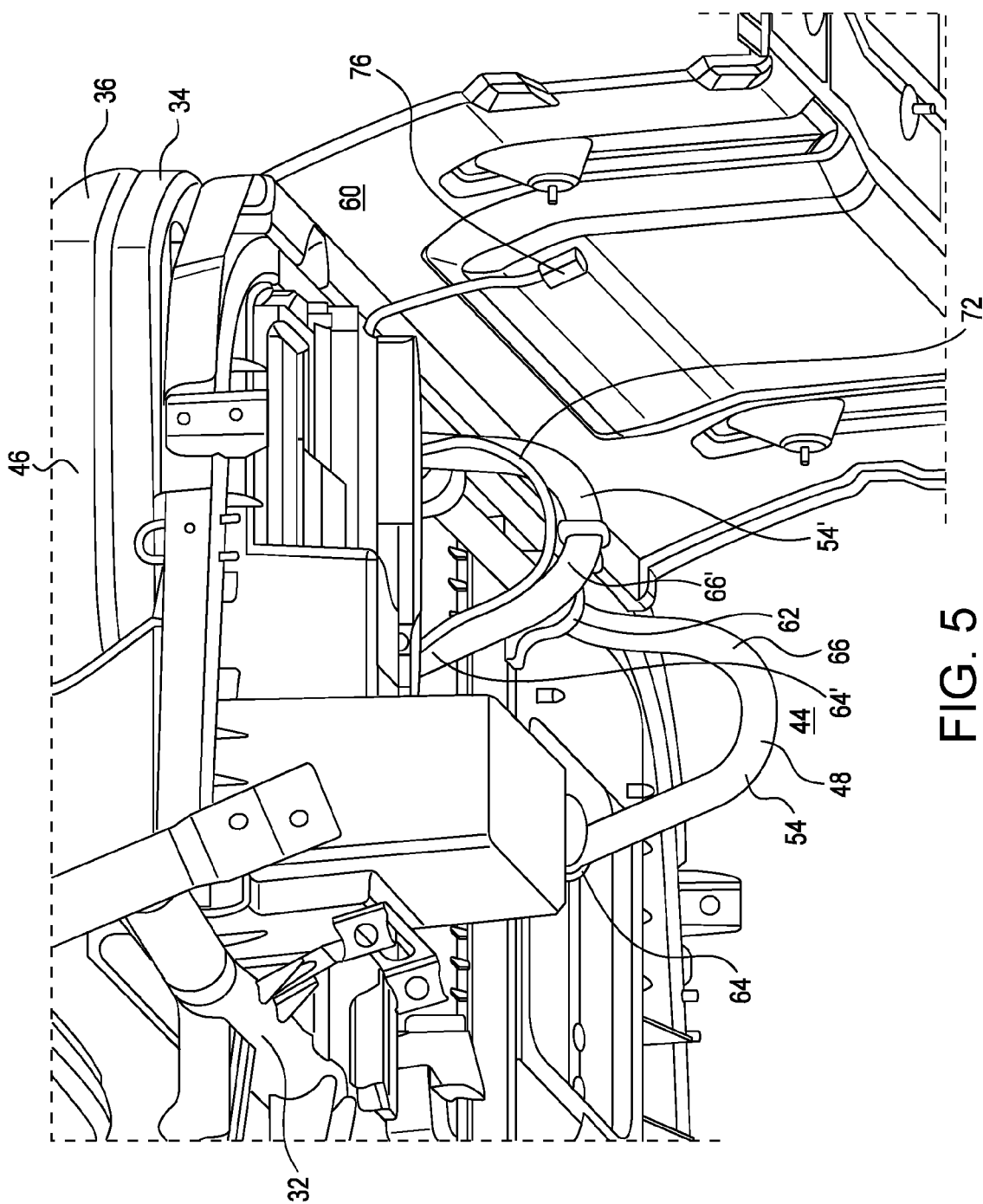
FIG. 5 is a right, rear, and upwardly perspective view of a movable seat for the vehicle illustrated in FIG. 1.

The second ends 64,64' of the U-shaped components 54,54' are rotatably connected to brackets 68 attached to the bottom side 40 of the seat frame 32. The brackets 68 are aligned along a second lateral axis $a_2$ rearward of the first lateral axis $a_1$, as illustrated in FIG. 4. In the embodiment illustrated in FIGS. 2-6, a bolt is threaded through in the brackets 68 and holes in the second ends 64,64' of the U-shaped component 54,54' along the second lateral axis $a_2$. The brackets 68 allow rotation of the U-shaped components 54,54' about the second lateral axis $a_2$. While one possible embodiment is illustrated in the Figures, any other connection known to those skilled in the art that permits rotation of the hinge 48 connection about the second lateral axis $a_2$ may be used.

In order to access the compartment 44, the front edge 70 of the seat top 46 is lifted up. The seat top 46 then translates forward until it is over the foot well area 52, which is forward of the movable seat 30 in a longitudinal direction. The only connection between the seat frame 34 and the base 32 is the connection at the second ends 64,64' of the U-shaped components 54,54'. Therefore, the front edge 70 of the seat top 46 is freely lifted. The seat top 46 then freely rotates about the first lateral axis $a_1$ as the hinge bar 56 rotates within the bushings 62, allowing the U-shaped components 54,54' to rotate about the first lateral axis $a_1$.

As the seat top 46 is moved forward, the seat top 46 rotates around the second lateral axis $a_2$ until the leading edge 70 of the seat top 46 is pointing downward. The seat top 46 is lowered until it reaches a stop in the foot well 52. The U-shaped components 54,54' surround the top 42 of the inner side 60 of the base 32 in the final lower position as shown in FIG. 6.

As vehicles 10, such as MUV's as illustrated in FIG. 1, become more complex, regulations have been promulgated requiring sensors 74 be placed in the seat cushions 36, such as those to detect occupants or the weight of occupants. These sensors may be connected to a CPU chip 76 located at some location in the vehicle 10, the location being a matter of design choice. The sensors 74 may be connected to the CPU 76 by wire 72 running from the seat cushion 36 to the CPU 76. In order to protect the wire 72 during movement of the seat top 46, the wire 72 is attached to one U-shaped component 54'. The wire 72 is free to rotate with the U-shaped component 54' as the seat top 46 is rotated about the first lateral axis $a_1$, and the U-shaped hinge 54' protects the wire 72 from damage in the compartment 44.

The U-shaped components 54,54' are preferably constructed of stainless steel, but may also be constructed of aluminum, magnesium, plastic, or any other suitable material known to one skilled in the art.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

The language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A movable seat for a motor vehicle, comprising:
   a base fixedly attached to a frame of the motor vehicle;
   a seat frame having a top side and a bottom side;
   a seat cushion fixedly attached to the top side of the seat frame;
   a first U-shaped hinge connecting the seat frame to the base, a first end of the first U-shaped hinge being rotatably attached to the base and rotating about a first lateral axis, a second end of the first U-shaped hinge being rotatably attached to the seat frame and rotating about a second lateral axis; and
   a wire connecting a first electrical appliance in the seat cushion to a second electrical appliance, the wire attached to the first U-shaped hinge from the first end to the second end.

2. The movable seat of claim 1 further comprising:
   a bracket attached to the seat frame, the second end of the first U-shaped hinge being connected to the bracket by a free rotation bolt along the second lateral axis, thereby creating a rotatable connection between the first U-shaped hinge and the seat frame along the second lateral axis.

3. The movable seat of claim 1 further comprising:
   a second U-shaped hinge connecting the seat frame to the base, a first end of the second U-shaped hinge being rotatably attached to the base and rotating about the first lateral axis, a second end of the second U-shaped hinge being rotatably attached to the seat frame and rotating about the second lateral axis.

4. The movable seat of claim 3 further comprising:
   a seat hinge bar connected to and extending between the first end of first U-shaped hinge and the first end of the second U-shaped hinge along the first lateral axis;
   a bushing attached to the seat frame for holding seat hinge bar, thereby creating a rotatable connection between the seat hinge bar and the base along the first lateral axis.

5. The movable seat of claim 4 further comprising:
   a second bushing attached to the seat frame for holding seat hinge bar, thereby creating a rotatable connection between the seat hinge bar and the base along the first lateral axis.

6. The movable seat of claim 3 further comprising:
a second bracket attached to the seat frame, the second end of the second U-shaped hinge being connected to the bracket by a free rotation bolt along the second lateral axis, thereby creating a rotatable connection between the second U-shaped hinge and the seat frame along the second lateral axis.

7. The movable seat of claim 1 wherein the first electrical appliance is a seat sensor indicating a presence of an occupant in the movable seat.

8. The movable seat of claim 7 wherein the second electrical appliance is a computer processing unit.

9. A movable seat for a motor vehicle, comprising:
a base fixedly attached to a frame of the motor vehicle;
a seat frame having a top side and a bottom side;
a seat cushion fixedly attached to the top side of the seat frame;
a first U-shaped hinge connecting the seat frame to the base, a first end of the first U-shaped hinge being rotatably attached to the base and rotating about a first lateral axis, a second end of the first U-shaped hinge being rotatably attached to the seat frame and rotating about a second lateral axis;
a second U-shaped hinge connecting the seat frame to the base, a first end of the second U-shaped hinge being rotatably attached to the base and rotating about the first lateral axis, a second end of the second U-shaped hinge being rotatably attached to the seat frame and rotating about the second lateral axis;
a first bracket attached to the seat frame, the second end of the first U-shaped hinge being connected to the bracket by a free rotation bolt along the second lateral axis, thereby creating a rotatable connection between the first U-shaped hinge and the seat frame along the second lateral axis;
a second bracket attached to the seat frame, the second end of the second U-shaped hinge being connected to the bracket by a free rotation bolt along the second lateral axis, thereby creating a rotatable connection between the second U-shaped hinge and the seat frame along the second lateral axis; and
a wire connecting a first electrical appliance in the seat cushion to a second electrical appliance, the wire attached to the first U-shaped hinge from the first end to the second end.

10. The movable seat of claim 9 further comprising:
a seat hinge bar connected to and extending between the first end of first U-shaped hinge and the first end of the second U-shaped hinge along the first lateral axis; and
a bushing attached to the seat frame for holding seat hinge bar, thereby creating a rotatable connection between the seat hinge bar and the base along the first lateral axis.

11. The movable seat of claim 10 further comprising:
a second bushing attached to the seat frame for holding seat hinge bar, thereby creating a rotatable connection between the seat hinge bar and the base along the first lateral axis.

12. The movable seat of claim 9 wherein the first electrical appliance is a seat sensor indicating a presence of an occupant in the movable seat.

13. The movable seat of claim 12 wherein the second electrical appliance is a computer processing unit.

* * * * *